US011242836B2

(12) United States Patent
Heald et al.

(10) Patent No.: US 11,242,836 B2
(45) Date of Patent: Feb. 8, 2022

(54) APPARATUSES, SYSTEMS, AND METHODS FOR PROVIDING POWER GENERATION

(71) Applicant: BGH Designs, LLC, Steamboat Springs, CO (US)

(72) Inventors: Barry G. Heald, Steamboat Springs, CO (US); Gerard Roberts, Steamboat Springs, CO (US); T. M. Hunt, Houston, TX (US)

(73) Assignee: BGH Designs, LLC, Steamboat Springs, CO (US)

( * ) Notice: Subject to any disclaimer, the term of this patent is extended or adjusted under 35 U.S.C. 154(b) by 0 days.

(21) Appl. No.: 17/104,401

(22) Filed: Nov. 25, 2020

(65) Prior Publication Data
US 2021/0310458 A1    Oct. 7, 2021

Related U.S. Application Data

(60) Provisional application No. 63/005,789, filed on Apr. 6, 2020.

(51) Int. Cl.
*F03B 13/08* (2006.01)
*H02K 7/18* (2006.01)
*H02K 7/116* (2006.01)

(52) U.S. Cl.
CPC ............ *F03B 13/083* (2013.01); *H02K 7/116* (2013.01); *H02K 7/1823* (2013.01); *F05B 2220/706* (2013.01)

(58) Field of Classification Search
CPC ..... F03B 13/083; H02K 7/1823; H02K 7/116; F05B 2220/706

USPC ...................................................... 290/43, 54
See application file for complete search history.

(56) References Cited

U.S. PATENT DOCUMENTS

| 2,133,991 | A | * | 10/1938 | Kerr | ........................ F22G 5/12 |
| | | | | | 122/479.1 |
| 4,797,563 | A | * | 1/1989 | Richardson | ............... F02C 3/00 |
| | | | | | 290/54 |
| 5,685,147 | A | | 11/1997 | Brassea | |

(Continued)

FOREIGN PATENT DOCUMENTS

CN           201582037 U        9/2010

OTHER PUBLICATIONS

International Search Report and Written Opinion for corresponding application No. PCT/US2020/062309, dated Mar. 9, 2021, 9 pages.

*Primary Examiner* — Charles Reid, Jr.
*Assistant Examiner* — Charles H Reid
(74) *Attorney, Agent, or Firm* — Patterson Intellectual Property Law, P.C.; Grant M. Ford

(57) ABSTRACT

Apparatuses, systems, and methods are provided for generating power. A pipe having an input flow is coupleable to an input section configured to receive at least a portion of the input flow. A generation section is coupleable to the input section and includes a pipe section to carry the at least a portion of the input flow, a turbine coupleable to the pipe section and configured to capture energy from the at least a portion of input flow carried by the pipe section, and a generator coupleable to the turbine and configured to generate power from the energy captured by the turbine. An output section is coupleable to the pipe and configured to provide output of the generation section to the pipe.

17 Claims, 17 Drawing Sheets

(56) References Cited

U.S. PATENT DOCUMENTS

| | | | | |
|---|---|---|---|---|
| 6,417,578 B1* | 7/2002 | Chapman | ............... | F03D 80/00 |
| | | | | 290/44 |
| 7,246,660 B2* | 7/2007 | Fripp | ................. | E21B 41/0085 |
| | | | | 166/65.1 |
| 7,959,411 B2 | 6/2011 | Schlabach et al. | | |
| 8,360,720 B2 | 1/2013 | Schlabach et al. | | |
| 10,233,895 B2* | 3/2019 | Yeo | ........................ | F03B 15/12 |
| 10,352,293 B2* | 7/2019 | Sakamoto | ............... | F03B 13/08 |
| 10,495,051 B2 | 12/2019 | Wang et al. | | |
| 10,925,222 B2* | 2/2021 | Sarver | ................... | G05B 15/02 |
| 2004/0126223 A1 | 7/2004 | Maloney | | |
| 2009/0110485 A1 | 4/2009 | Cripps | | |
| 2011/0006530 A1* | 1/2011 | Van Blerk | ................ | E02B 9/00 |
| | | | | 290/52 |
| 2012/0306205 A1 | 12/2012 | Cosby et al. | | |
| 2013/0292945 A1 | 11/2013 | Schlabach et al. | | |
| 2014/0265328 A1* | 9/2014 | Van Blerk | ............... | F03B 13/00 |
| | | | | 290/43 |
| 2015/0322810 A1 | 11/2015 | Finley et al. | | |

\* cited by examiner

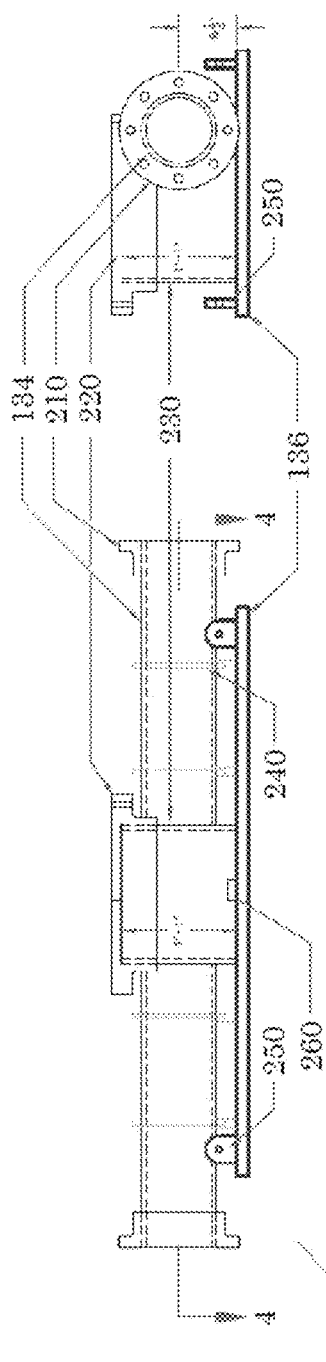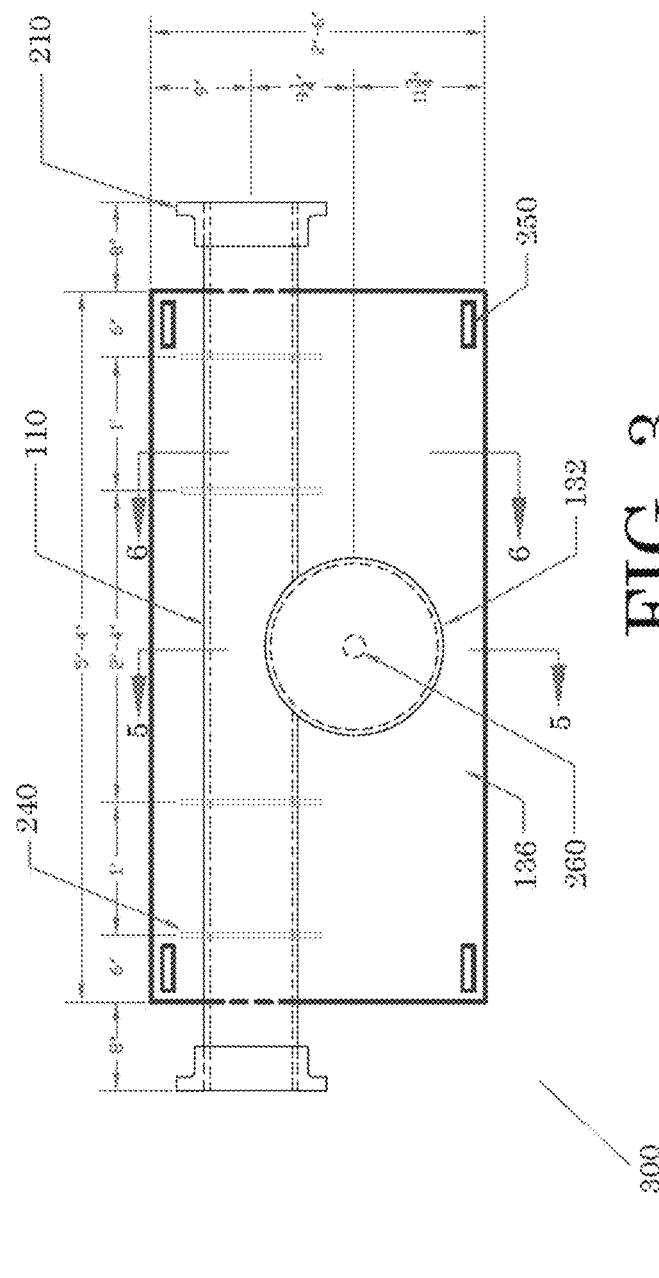

APPARATUSES, SYSTEMS, AND METHODS FOR PROVIDING POWER GENERATION

CROSS-REFERENCES TO RELATED APPLICATIONS

This application claims priority to and benefit of U.S. Provisional Patent Application No. 63/005,789, filed Apr. 6, 2020, entitled "Apparatuses, Systems, and Methods for Providing Power Generation," and which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present disclosure relates generally to apparatuses, systems, and methods for providing power generation.

Existing systems may include inefficiencies relating to the flow and/or pressure of materials such as compressed gas or liquid in existing pipes or lines whereby a constant or nonzero pressure is maintained in an existing pipe or line. For example, a factory may have a compressed air line at a high pressure which is not fully required at all times or that is not fully utilized when in use (e.g., because less than a total amount is required). As such, energy is wasted in maintaining the gas or liquid pressure in the line which may not be recovered.

Although some systems may be implemented within a pipe to generate power, for example by converting flow energy of water within the pipe, such systems necessarily suffer from disadvantages of being within the pipe itself, including problems for maintenance, repair, and replacement, during which the entire flow or pressure within the pipe must be stopped so that the power generation element may be maintained, repaired, or replaced.

Accordingly, what is needed is a way to capture excess or unused potential energy.

BRIEF SUMMARY

Embodiments of the present invention provide apparatuses, systems, and methods for providing power generation.

Implementations consistent with the present disclosure provide the ability to generate power from flows or pressure in existing lines, such as compressed gases or liquids. This is accomplished, for example, by redirecting at least a portion of flow in the existing line through a bypass section having a turbine or other power generation means configured to convert at least a portion of the redirected flow into generated power. The generated power may then be used to provide power to a local or remote element or may be stored for later usage or transmission (e.g., via a battery or capacitive device).

Although the instant specification and figures provide specific measurements it should be recognized that such measurements are exemplary in nature and pertain to one or more example embodiments described herein. Accordingly, the present disclosure is not to be limited to one or more measurement values provided in the instant specification and/or figures, as measurements will vary based upon numerous implementation factors, such as existing pipe, tube, or hose size, flow rate or pressure within the existing pipe, tube, or hose, power generation desired, etc.

According to aspects of the present disclosure, provided is an apparatus for providing power generation when coupled to a pipe having an input flow. The apparatus includes an input section coupleable to the pipe, the input section configured to receive at least a portion of the input flow. The apparatus further includes a generation section coupleable to the input section, the generation section including a pipe section configured to carry the at least a portion of the input flow, a turbine coupleable to the pipe section and configured to capture energy from the at least a portion of input flow carried by the pipe section, and a generator coupleable to the turbine and configured to generate power from the energy captured by the turbine. The apparatus also includes an output section coupleable to the pipe and configured to provide output of the generation section to the pipe.

The apparatus may also include at least one valve, the at least one valve configured to control an amount of the at least a portion of the input flow carried through the generation section. The at least one valve may enable the at least a portion of the input flow to be less than an entire amount of the input flow.

The turbine of the generation section may capture energy from at least one of a liquid or a gas as the at least a portion of input flow carried by the pipe section.

The apparatus may include a transfer mechanism coupleable between the turbine and the generator to transfer at least a portion of the captured energy to the generator. A gear box may be coupleable to the transfer mechanism between the turbine and the generator. The gear box may translate motion received at the gear box from the transfer mechanism via the turbine to the generator.

The generation section may further includes a flange adapter assembly having a tube configured to fit within at least a portion of the pipe section, and a flow redirector coupleable to the tube, the flow redirector configured to redirect at least a portion of the input flow within the pipe section.

According to further aspects of the present disclosure, provided is a system for providing power generation. The system includes a pipe having an input flow, an input section coupleable to the pipe, the input section configured to receive at least a portion of the input flow, a generation section coupleable to the input section, the generation section including a pipe section configured to carry the at least a portion of the input flow, a turbine coupleable to the pipe section and configured to capture energy from the at least a portion of input flow carried by the pipe section, and a generator coupleable to the turbine and configured to generate power from the energy captured by the turbine, and an output section coupleable to the pipe and configured to provide output of the generation section to the pipe.

The pipe may include a valve configured to restrict flow through at least a portion of the pipe.

At least one valve may be coupled between one of the input section and the pipe or the output section and the pipe, the at least one valve configured to control an amount of the at least a portion of the input flow carried through the generation section. The at least one valve may enable the at least a portion of the input flow to be less than an entire amount of the input flow.

The system may include a plurality of generation sections coupleable to the pipe at one or more locations via one or more corresponding input sections.

The turbine of the generation section may capture energy from at least one of a liquid or a gas as the at least a portion of input flow carried by the pipe section.

The system may include a transfer mechanism coupleable between the turbine and the generator to transfer at least a portion of the captured energy to the generator. A gear box may be coupleable to the transfer mechanism between the turbine and the generator. The gear box may translate motion received at the gear box from the transfer mechanism via the turbine to the generator.

The generation section may further include a flange adapter assembly having a tube configured to fit within at least a portion of the pipe section, and a flow redirector coupleable to the tube, the flow redirector configured to redirect at least a portion of the input flow within the pipe section.

According to yet additional aspects of the present disclosure, provided is a method for providing power generation. The method includes operations for receiving an input flow at a pipe, redirecting at least a portion of the input flow from the pipe to an input section, providing the redirected at least a portion of the input flow to a pipe section of a generation section, capturing energy from the at least a portion of input flow carried by the pipe section, generating power at the generation section by a generator based upon the captured energy, and outputting the at least a portion of the input flow to the pipe.

The method may further include controlling an amount of the redirected at least a portion of the input flow based at least in part using a valve coupled to the pipe.

The input flow may be at least one of a liquid or a gas.

The method may further include redirecting at least a portion of the at least a portion of the input flow in the pipe section using a redirector within the pipe section.

Numerous other objects, features, and advantages of the present invention will be readily apparent to those skilled in the art upon a reading of the following disclosure when taken in conjunction with the accompanying drawings.

BRIEF DESCRIPTION OF THE SEVERAL VIEWS OF THE DRAWINGS

FIG. 2A illustrates an exemplary embodiment of a front view of the system of FIG. 1 according to aspects of the present disclosure.

FIG. 2B illustrates an exemplary embodiment of a side view of the system of FIG. 1 according to aspects of the present disclosure.

FIG. 3 illustrates a partial top plan view of an exemplary embodiment of a system according to aspects of the present disclosure.

DETAILED DESCRIPTION

Figure 1:
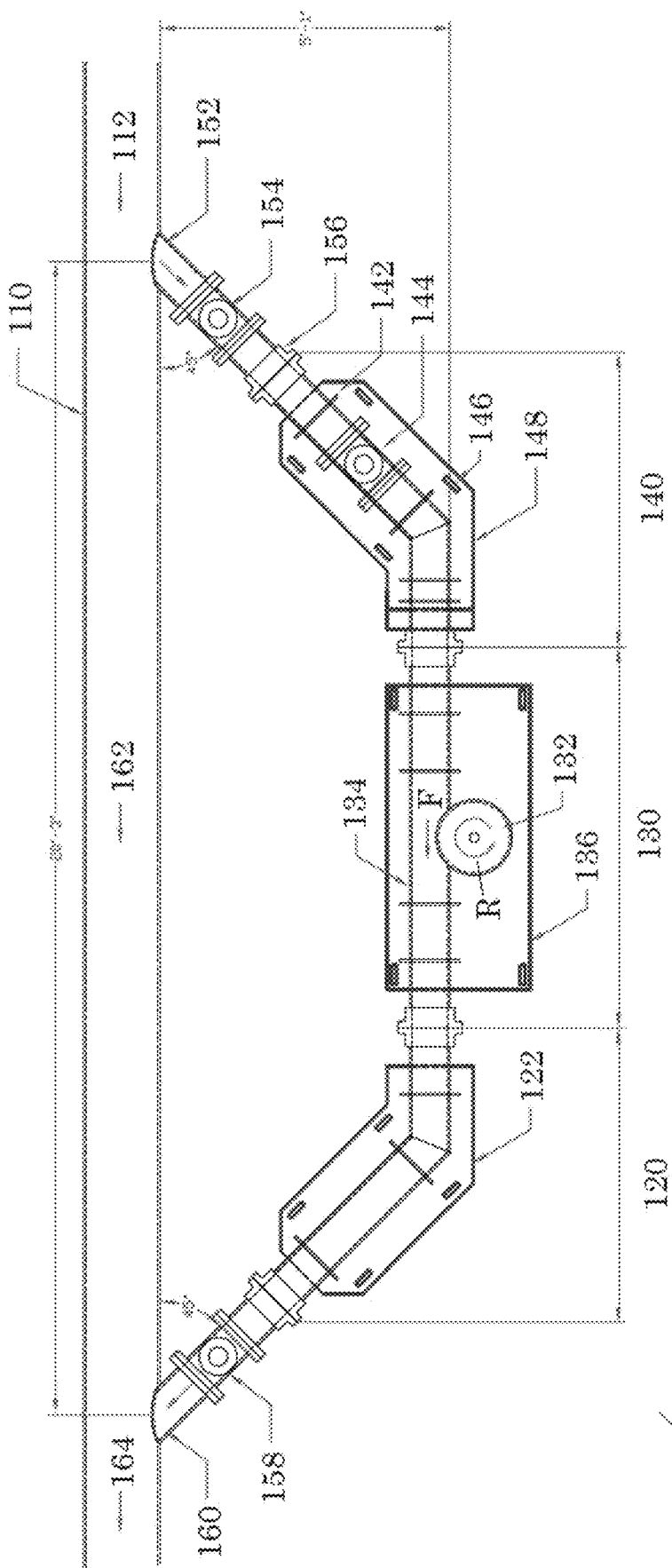
FIG. 1 illustrates a partial top view of an exemplary embodiment of a system according to aspects of the present disclosure.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-22, various exemplary apparatuses, systems, and associated methods according to the present disclosure are described in detail. Where the various figures may describe embodiments sharing various common elements and features with other embodiments, similar elements and features are given the same reference numerals and redundant description thereof may be omitted below.

Various embodiments of an apparatus and/or system according to the present invention may provide power generation.

As illustrated, for example, by FIG. 1, systems consistent with the present disclosure include a bypass configuration 100 including one or more of a pipe 110, an output section 120, a generation section 130, and/or an input section 140. The pipe 110 may be an existing pipe or tube configured to transport one or more of a liquid, gas, or solid therein. In various embodiments, the pipe 110 may be configured to transport a gas, such as a compressed gas therein. The compressed gas may be oxygen, carbon dioxide, compressed air, or any other gas or combination of gases. Additionally or alternatively, the pipe 110 may be configured to transport a liquid, such as water or other liquid therein. In an exemplary embodiment, the pipe 110 is an air line, for example a sixteen-inch air line. The pipe 110 may be an existing air line in various embodiments. Although described with reference to a pipe, it should be appreciated that the pipe 110 may include any partially or fully enclosed passageway through which a material such as liquid, gas, or solid (or combination thereof) may be transported. The pipe 110 may be an existing air line at a factory or plant, for example.

The pipe 110 may be coupled to an input 152. The input 152 may include a section of pipe configured to permit at least a portion of material transported in the pipe 110 to bypass at least a portion of the pipe 110. A size, shape, or configuration of the pipe of the input 152 may vary based at least in part upon a characteristic of the pipe 110, installation features of the pipe 110 and/or generation system, or any other physical or logical configuration. Although the pipe of the input 152 is angled at 45 degrees from pipe 110 in FIG. 1 it should be appreciated that the angle therebetween may be selected based at least in part upon one or more factors such as pipe sizes, flow rates, desired power generation, physical installation requirements, etc.

An input valve 154 may be configured to control an input rate of material from the pipe 110 through the bypass system. The input valve may be a gate valve in various embodiments. A size, shape, and/or configuration of the input valve may be selected or otherwise determined based at least in part upon one or more characteristics of the pipe 110, input 152, flange 156, or combination thereof. Although described with reference to a bypass it should be appreciated that less than all material transported through the pipe 110 may pass through the bypass system, for example based at least in part upon an operational setting of the input valve 154. The input valve 154 may be manually and/or automatically operated by a user and/or electronic or mechanical control system. A flange 156 may be used to couple the input 152 to the input section 140. A size, shape, and/or configuration of the flange 156 may be selected based at least in part upon a size of pipe used for the input 152 and/or input section 140.

The input section may include one or more of a pipe support 142, a pressure regulator valve 144, a lifting eye 146, and/or a skid plate 148. The pipe support 142 may be a U-bolt type pipe support or other pipe support as known in the art. The pressure regulator valve 144 may be configured to control an input pressure into the input section 140 in various embodiments, for example to provide safety and/or to control power generation based on flow rate (either in whole or in part). At least a portion of the input section 140 may be coupled to a skid plate 148. The skid plate 148 may be configured to permit at least a portion of the input section 140 to be coupleable to a skid or may form at least a portion of a skid itself. The skid plate 148 may include at least one lifting eye 146, optionally configured to permit ease of movement of the skid plate 148, the input section 140, or one or more aspects of the system disclosed herein, in whole or in part.

A generation section 130 may be coupleable to the input section 140, for example via a flange or adapter at one or more of the generation section 130 and/or input section 140. The generation section 130 may include one or more of a turbine 132, and/or a pipe section 134, one or more of which may be coupled to or coupleable to a skid plate 136. The turbine 132 may be configured to rotate in a rotation direction R according to a generator flow rate F through the pipe section 134. In various embodiments, the turbine 132 may include a plurality of blades configured to cause at least a portion of the turbine 132 to rotate in the rotation direction R when at least a portion of material flows through the pipe section 134. One or more of the plurality of blades of the turbine 132 may extend into at least a portion of the pipe section 134, and may be variously statically and/or dynamically configured to extend a fixed and/or variable length into the pipe section 134 (either manually or in an automated manner, for example using a control device). The pipe section 134 may be of a size, shape, and/or configuration based at least in part upon one or more physical or generation requirements. In one exemplary embodiment the pipe section 134 is an eight-inch pipe. The turbine 132 may be configured to directly generate power via one or more components thereof (e.g., using at least one power generation element formed as a part of the turbine 132 or otherwise coupled to or coupleable thereto) and/or may be configured to transfer energy to one or more other elements configured to generate power (such as a generator 510 as described herein), for example via a rotating shaft or other energy transfer element. The generation section 130 may be coupled to or coupleable to an output section 120.

The output section 120 may include at least a portion of pipe coupled to or coupleable to a skid plate 122. The output section 120 may be coupleable to an output valve 158. The output valve 158 may be configured to control, either in whole or in part, the generator flow rate F, either alone or in combination with at least one operational configuration of the input valve 154. The output valve 158 may be configured to be controlled, in whole in part, manually or in an automated manner, or combination thereof. An output of the output valve 158 may be coupled to an output 160 coupled to the pipe 110. Although the pipe of the output 160 is angled at 45 degrees from pipe 110 in FIG. 1 it should be appreciated that the angle therebetween may be selected based at least in part upon one or more factors such as pipe sizes, flow rates, desired power generation, physical installation requirements, etc.

In various exemplary embodiments, a plurality of generation sections 130 may be coupleable to the pipe 110 via a single input section 140, the plurality of generation sections 130 configured in at least one of a parallel or serial configuration with respect to one another. Additionally or alternatively, a plurality of generation sections may be coupleable to the pipe 110 at a plurality of locations along the pipe 110 via a plurality of input sections 140, either in parallel or serial configuration with respect to one another.

During operation, at least a portion of the input flow 112 may be directed in whole or in part into the bypass system including the generation section 130. Based on the flow diversion of the material in the pipe 110, an intermediate flow 162 may flow through the pipe 110 when less than all flow of the pipe 110 is directed into the input 152. An exit flow 164 relates to the sum of intermediate flow 162 and an output flow rate of the output 160 from the bypass system. One or more pipe elements through the bypass system may have a same size, shape, or throughput in various embodiments. For example, the entirety or a portion of the bypass system may include eight-inch pipe.

FIG. 2A illustrates an exemplary embodiment of a front view of the system of FIG. 1 according to aspects of the present disclosure. FIG. 2B illustrates an exemplary embodiment of a side view of the system of FIG. 1 according to aspects of the present disclosure. The system 200 includes the pipe section 134 of the generation section 130 of FIG. 1 coupled to a generator housing 230 according to aspects of the present disclosure. The system 200 includes a flange 210 coupleable to the pipe section 134 to couple to the input section 140. A generator flange 220 may be coupled to the generator housing 230 to couple to one or more elements of a generator. The generator housing 230 may include or may be a segment of pipe. The generator housing 230 may be a sixteen-inch pipe in various embodiments, although a size, shape, and/or configuration of the generator housing 230 may be based at least in part upon one or more parameters of characteristics of the flow rate and/or power generation described herein.

The system 200 includes the skid plate 136 of FIG. 1, optionally including one or more lifting eyes 250 (e.g., configured in a manner at least similar to the lifting eye 146 described above with reference to FIG. 1). One or more pipe supports 240 may be provided by the system 200, optionally coupled to or coupleable to the skid plate 136. The system 200 may include a bearing washer 260 associated with the generator housing 230, for example configured to support or otherwise enable operation of at least one of the turbine 132, a generator coupled to the turbine 132, and/or an element coupled to or coupleable thereto.

FIG. 3 illustrates a partial top plan view of an exemplary embodiment of a system according to aspects of the present disclosure. The system 300 optionally includes one or more of the elements described above with reference to FIGS. 1 and 2.

Figure 4:
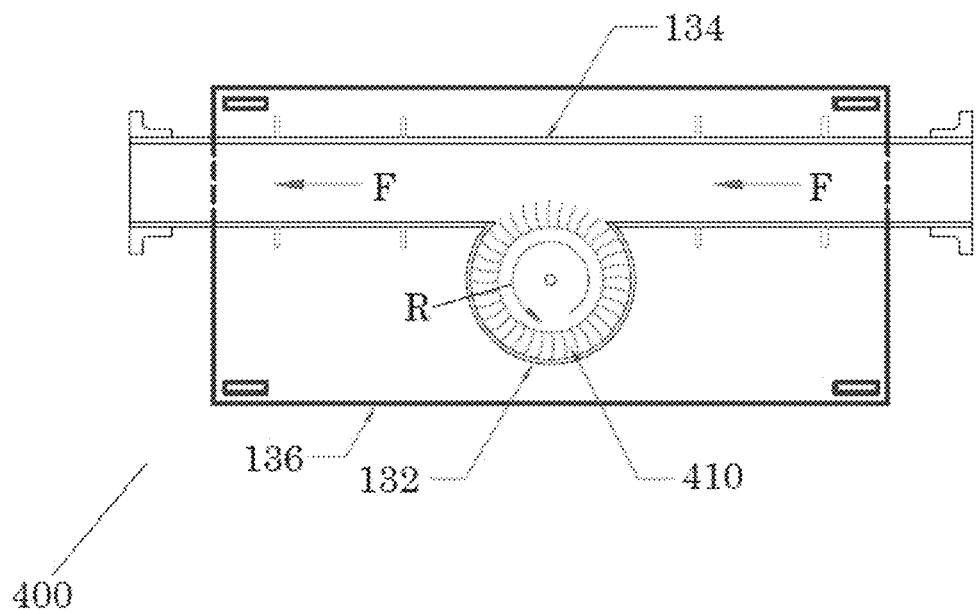
FIG. 4 illustrates a cross sectional view taken along line 4-4 of FIG. 2, illustrating an exemplary embodiment of a partial top plan view according to aspects of the present disclosure.

FIG. 4 illustrates a cross sectional view taken along line 4-4 of FIG. 2, illustrating an exemplary embodiment of a partial top plan view according to aspects of the present disclosure. The system 400 includes the skid plate 136 of the generation section 130 having a pipe section 134 with a generator flow rate F therewithin. The turbine 132 includes a plurality of fans or blades 410 coupled thereto and configured to rotate in the rotation direction R based at least in part upon the generator flow rate F and an amount of extension of at least one of the plurality of fans or blades 410 within the pipe section 134.

Figure 5:
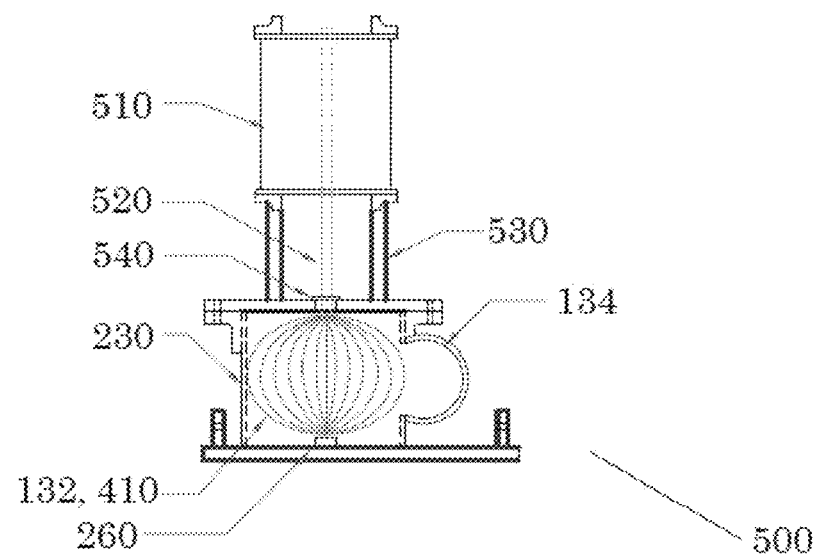
FIG. 5 illustrates a cross sectional view taken along line 5-5 of FIG. 3, illustrating an exemplary embodiment of a partial side view according to aspects of the present disclosure.

FIG. 5 illustrates a cross sectional view taken along line 5-5 of FIG. 3, illustrating an exemplary embodiment of a partial side view according to aspects of the present disclosure. The system 500 includes a generator 510 coupled to the turbine 132 via at least one transfer mechanism 520. The transfer mechanism 520 may be a shaft configured to rotate according to movement of the plurality of fans or blades 410. At least a portion of the transfer mechanism 520 may be enclosed within a generator support 530. The generator support 530 may be coupled to or coupleable to the generator housing 230. Although not illustrated by FIG. 5, one or more power transfer or storage devices or mediums may be included as a part of or coupleable to the generator 510 to store and/or transfer generated power to at least one other device or element internal to and/or external to the system. In various embodiments the generator 510 or element coupled to or coupleable thereto is configured to store at least a portion of the power generated by the generator 510, in at least one of a temporary or permanent manner (e.g., via battery, transmission line, etc.). A seal 540 may be used to secure the transfer mechanism 520 between the generator 510 and the generator housing 230

Figure 6:
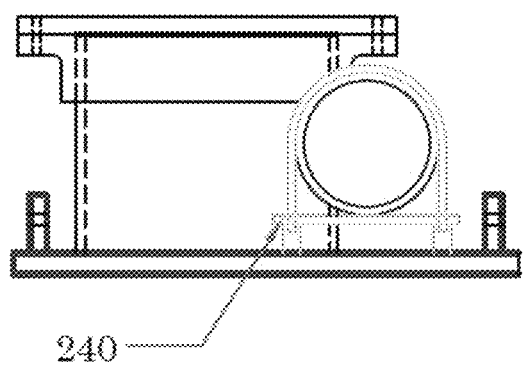
FIG. 6 illustrates a cross sectional view taken along line 6-6 of FIG. 3, illustrating a partial side view of an exemplary embodiment of Section C illustrated by FIG. 3 according to aspects of the present disclosure.

FIG. 6 illustrates a partial side view of an exemplary embodiment of Section C illustrated by FIG. 3 according to aspects of the present disclosure. FIG. 6 illustrates a pipe support 240 supporting at least a portion of the pipe section 134.

Figure 7:
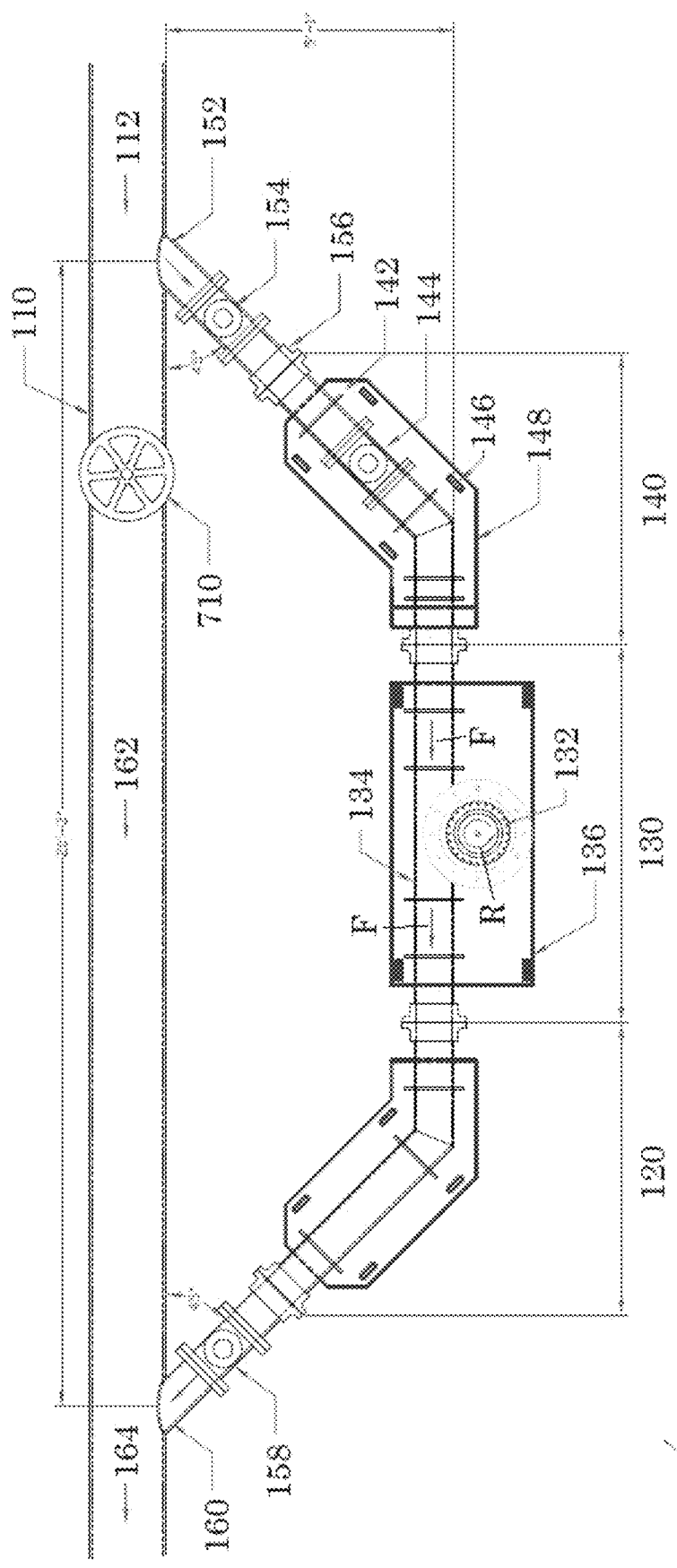
FIG. 7 illustrates a partial top view of an exemplary embodiment of a system according to aspects of the present disclosure.

FIG. 7 illustrates a partial top view of an exemplary embodiment of a system according to aspects of the present disclosure. The system 700 is an optional variation of the system illustrated by FIGS. 1-6. The system 700 includes identified features of FIG. 1 in combination with a valve 710 coupled to the pipe 110. The valve 710 may be a globe valve in various embodiments, although other types of valves may be used without departing from the spirit and scope of the present disclosure. The valve 710 may be manually controlled, automatically controlled, or a combination thereof to control a rate of flow within the pipe 110 and/or an amount of material from the pipe 110 to be transferred through the illustrated bypass system. The generation section 130 may include a generator and at least a portion of the turbine 132 below the skid plate 136.

Figure 8:
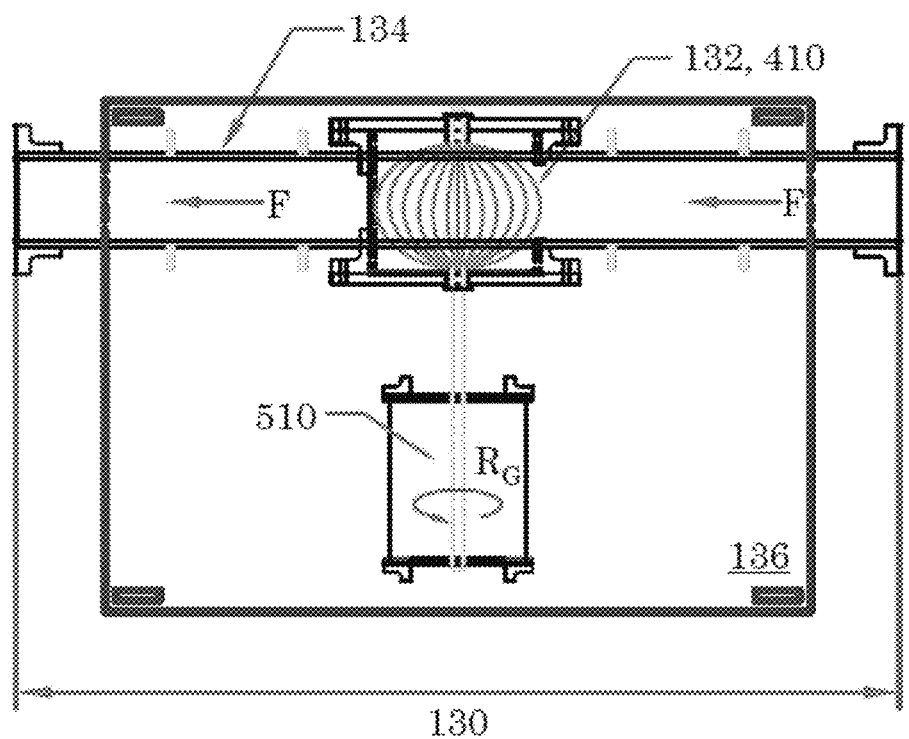
FIG. 8 illustrates a partial top view of an exemplary embodiment of a generation section according to aspects of the present disclosure.

FIG. 8 illustrates a partial top view of an exemplary embodiment of a generation section according to aspects of the present disclosure. The generation section 130 includes a generator 510 coupled to the turbine 132 and/or plurality of fans or blades 410 coupled thereto via at least one transfer mechanism 520, the generator 510 configured to generate power by translating received energy from the transfer mechanism 520 into generative motion in a generator rotation direction R_G. In the embodiment illustrated by FIG. 8, the generator 510 may be placed to the side of the turbine 132. One or more elements of FIG. 8 may be coupled to the skid plate 136.

Figure 9:
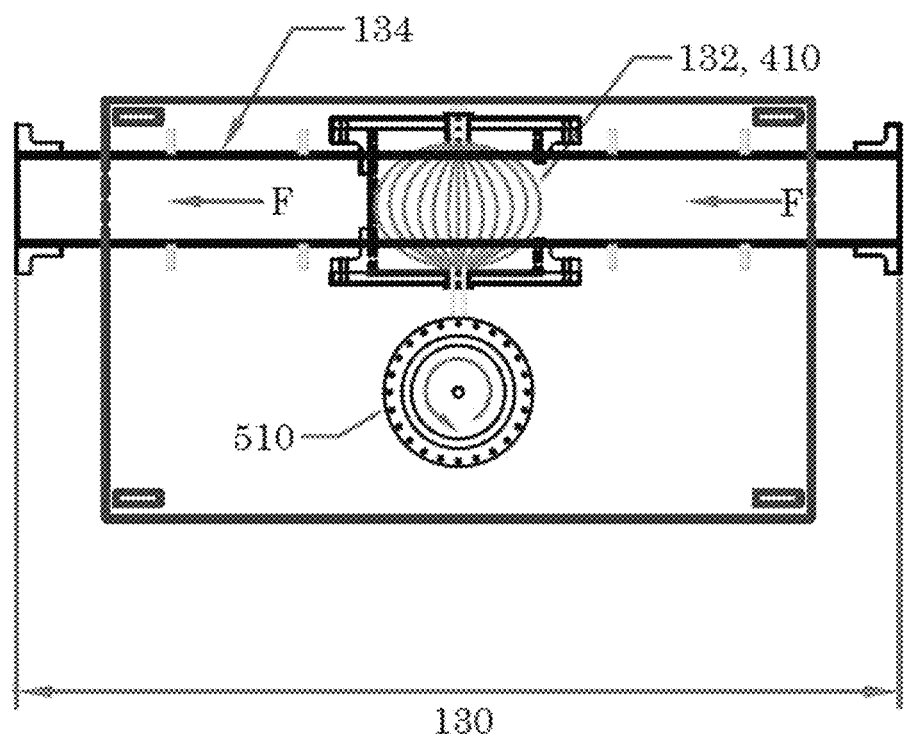
FIG. 9 illustrates a partial top view of an exemplary embodiment of a generation section according to aspects of the present disclosure.

FIG. 9 illustrates a partial top view of an exemplary embodiment of a generation section according to aspects of the present disclosure. The generation section 130 of FIG. 9 illustrates an alternative configuration of the generator 510 compared to FIG. 8. For example, the configuration illustrated by FIG. 9 may include a generator 510 configured in an angled or perpendicular (e.g., vertical) configuration relative to the turbine 132 and/or plurality of fans or blades 410.

FIG. 10A illustrates an exemplary embodiment of a front view of an alternative system of FIG. 1 according to aspects of the present disclosure. FIG. 10B illustrates an exemplary embodiment of a side view of an alternative system of FIG. 1 according to aspects of the present disclosure. The system 1000 illustrated by FIGS. 10A and 10B includes a generator 510 in a vertical configuration relative to the embodiment illustrated by FIG. 2. The system 1000 includes a generator flange 1010 coupled to the generator 510. A generator support 1020 is optionally used to at least partially support the generator 510. A seal 1030 may be used to secure the transfer mechanism 520 between the generator 510 and the turbine housing 1040.

Figure 10:
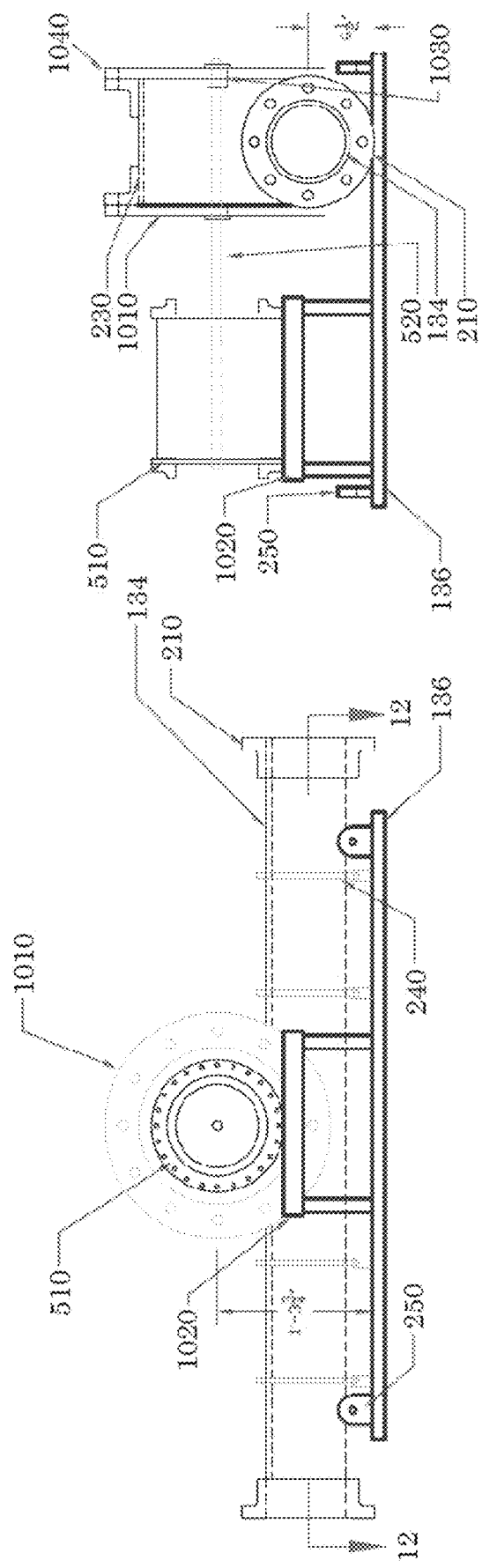
FIG. 10A illustrates an exemplary embodiment of a front view of an alternative system of FIG. 1 according to aspects of the present disclosure.
FIG. 10B illustrates an exemplary embodiment of a side view of an alternative system of FIG. 1 according to aspects of the present disclosure.
Figure 11:
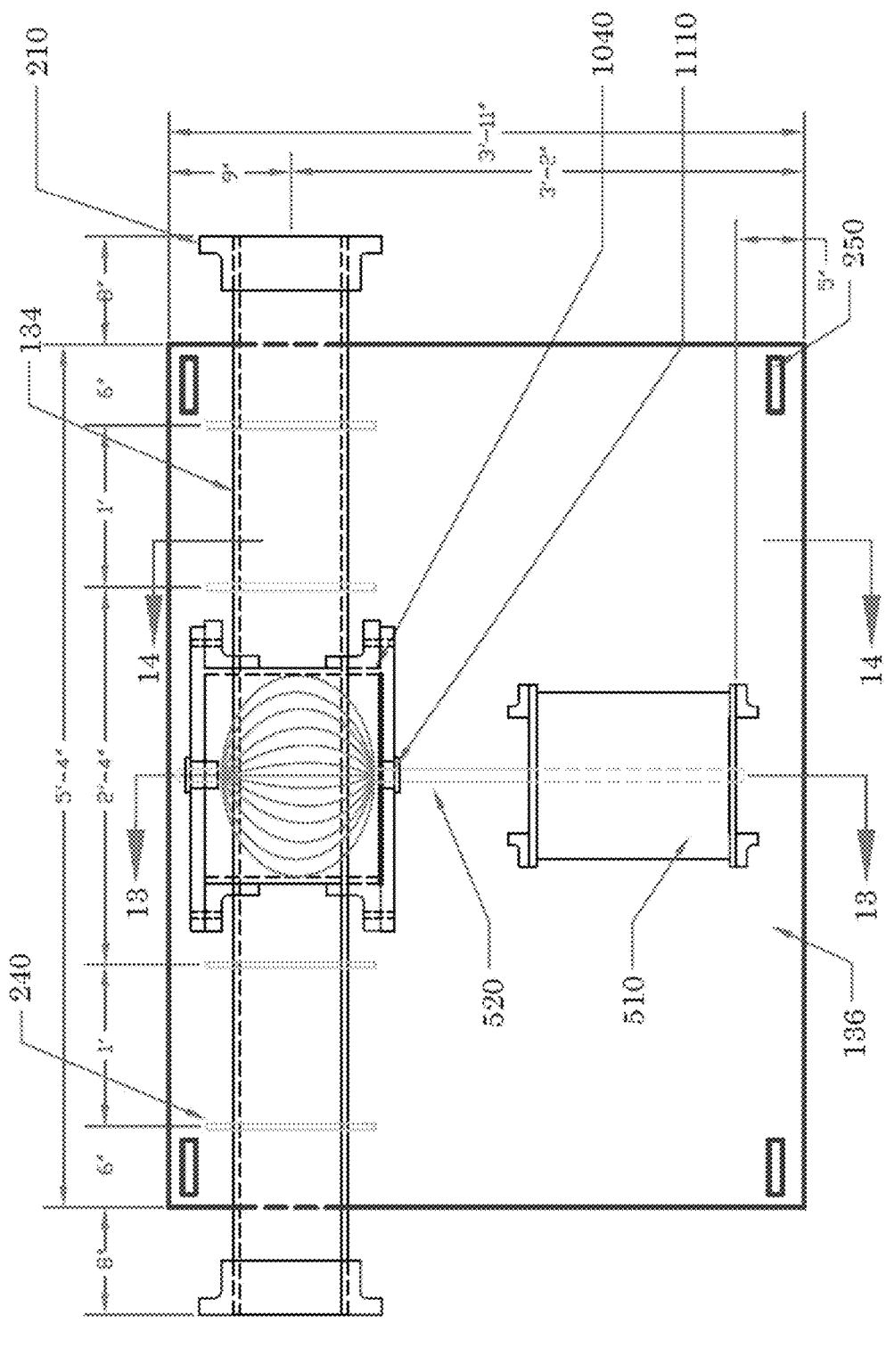
FIG. 11 illustrates a partial top plan view of an exemplary embodiment the system of FIGS. 10A-10B according to aspects of the present disclosure.

FIG. 11 illustrates a partial top plan view of an exemplary embodiment the system of FIGS. 10A-10B according to aspects of the present disclosure. The system 1000 illustrated by FIG. 11 includes the identified features described above with reference to FIGS. 1 and 10 and a seal 1110 coupled to the turbine housing 1040.

Figure 12:
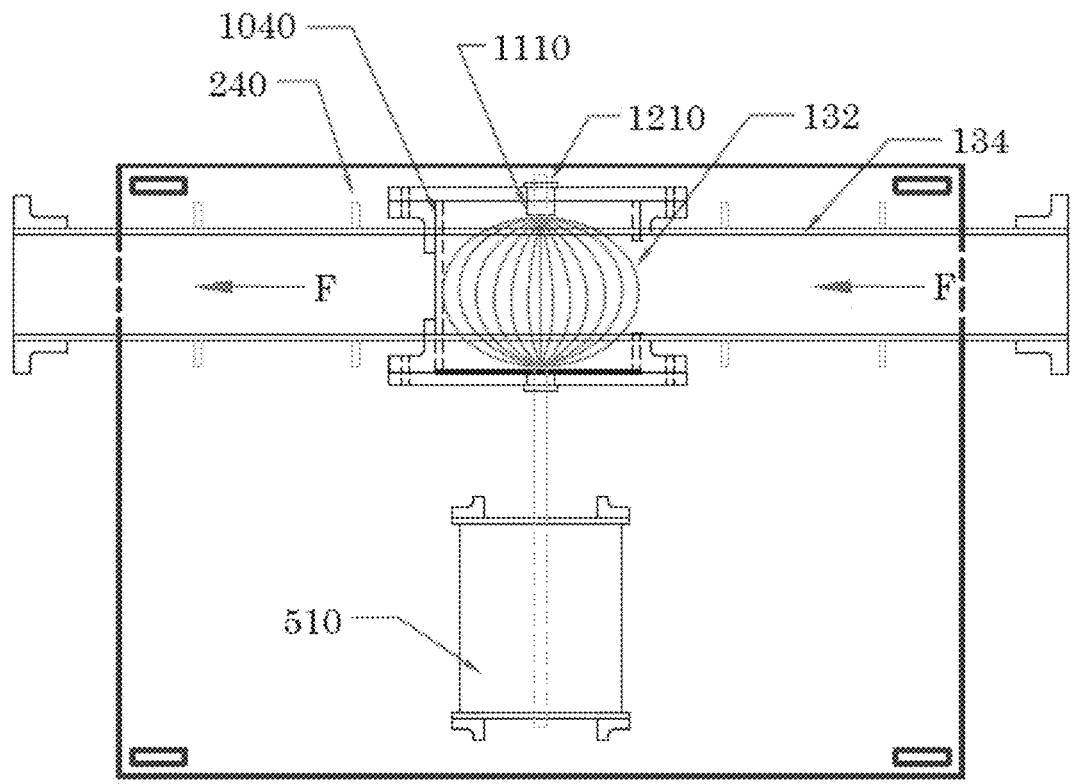
FIG. 12 illustrates a cross sectional view taken along line 12-12 of FIG. 10A, illustrating an exemplary embodiment of a partial top plan view according to aspects of the present disclosure.

FIG. 12 illustrates a cross sectional view taken along line 12-12 of FIG. 10A, illustrating an exemplary embodiment of a partial top plan view according to aspects of the present disclosure. The system optionally includes at least one seal 1210 coupled to the turbine housing 1040.

Figure 13:
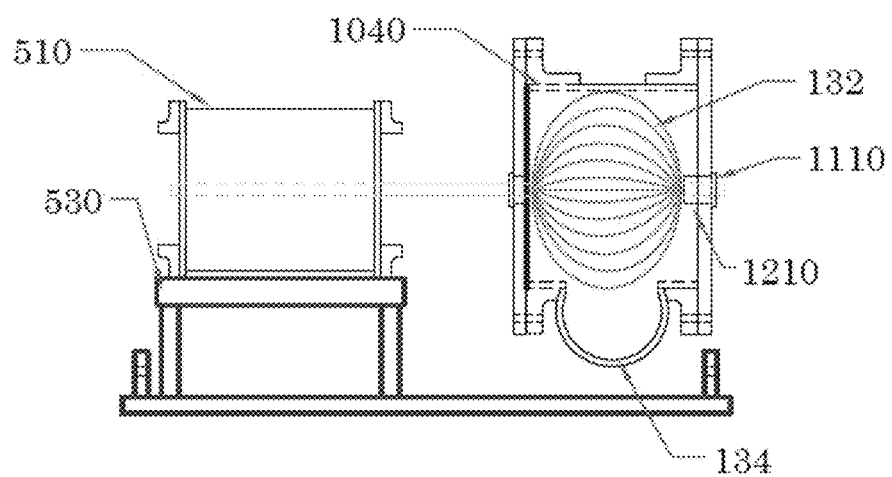
FIG. 13 illustrates a cross sectional view taken along line 13-13 of FIG. 11, illustrating an exemplary embodiment of a partial side view according to aspects of the present disclosure.

FIG. 13 illustrates a cross sectional view taken along line 13-13 of FIG. 11, illustrating an exemplary embodiment of a partial side view according to aspects of the present disclosure.

Figure 14:
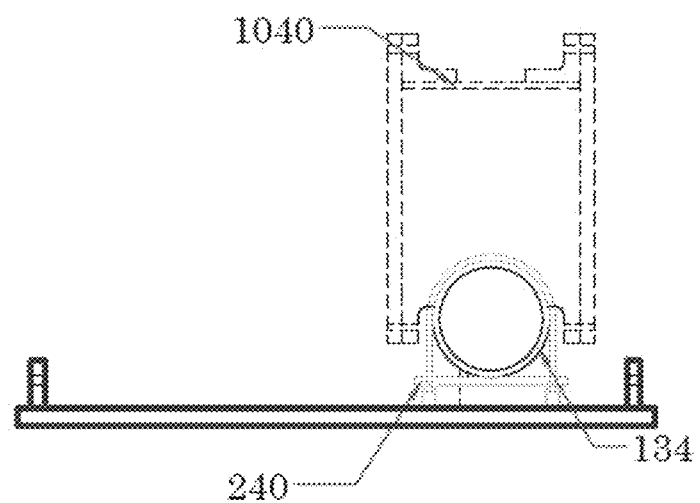
FIG. 14 illustrates a cross sectional view taken along line 14-14 of FIG. 11, illustrating an exemplary embodiment of a partial side view according to aspects of the present disclosure.

FIG. 14 illustrates a cross sectional view taken along line 14-14 of FIG. 11, illustrating an exemplary embodiment of a partial side view according to aspects of the present disclosure.

Figures 15A, 15B:
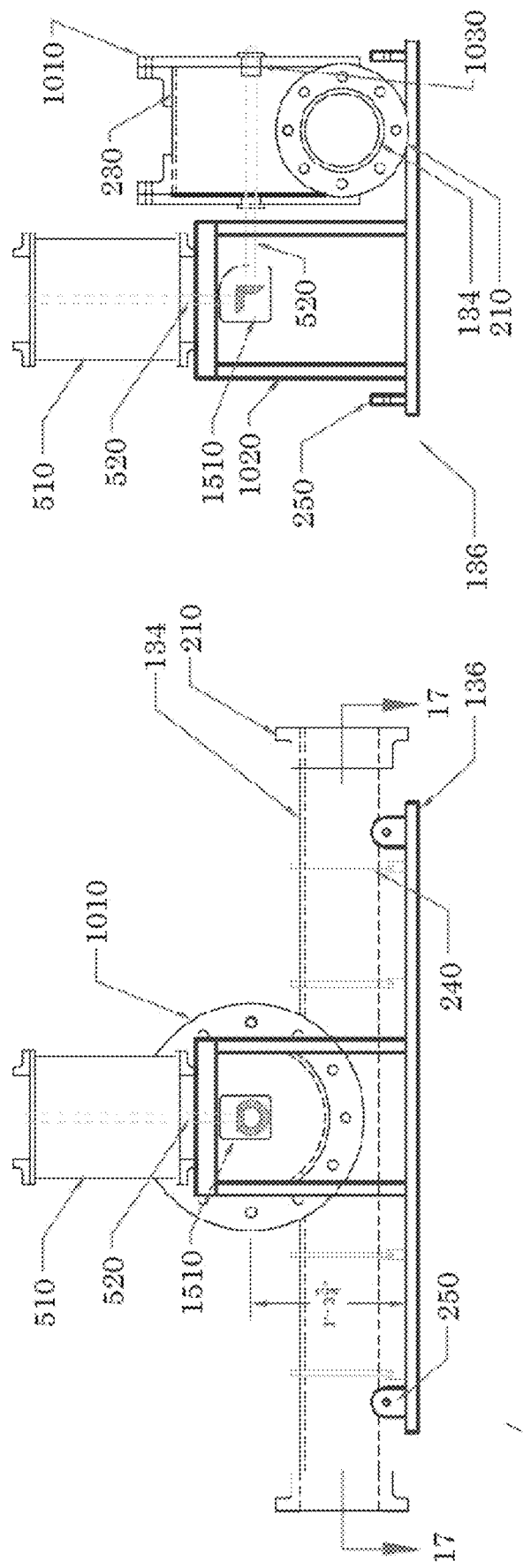
FIG. 15A illustrates an exemplary embodiment of a front view of an alternative system of FIG. 1 according to aspects of the present disclosure.
FIG. 15B illustrates an exemplary embodiment of a side view of an alternative system of FIG. 1 according to aspects of the present disclosure.

FIG. 15A illustrates an exemplary embodiment of a front view of an alternative system of FIG. 1 according to aspects of the present disclosure. FIG. 15B illustrates an exemplary embodiment of a side view of an alternative system of FIG. 1 according to aspects of the present disclosure. The system 1500 of FIGS. 15A-15B includes a generator 510 in a vertical configuration and having a gear box 1510 configured to translate motion received at the gear box 1510 from the transfer mechanism 520 to the generator 510, for example at a different angle or plane than that of the transfer mechanism 520 from the turbine 132.

Figure 16:
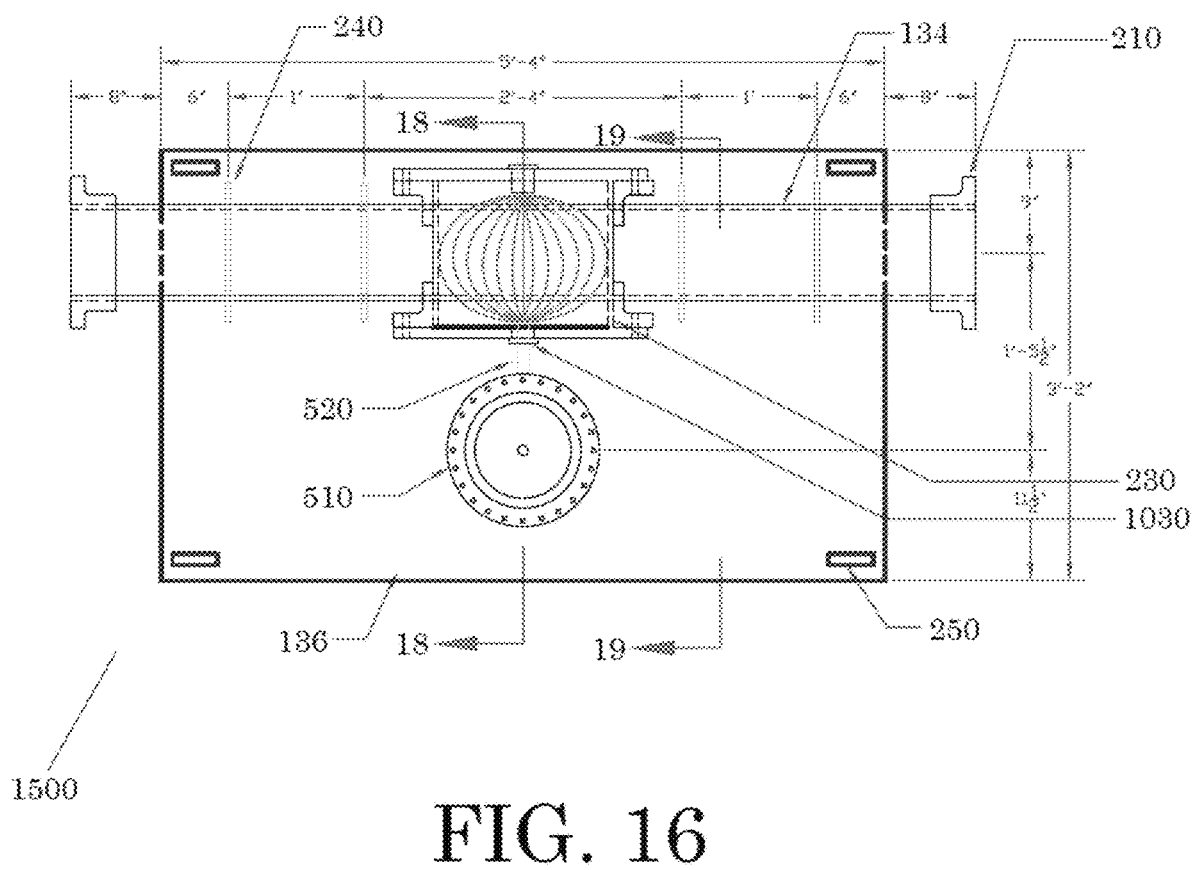
FIG. 16 illustrates a partial top plan view of an exemplary embodiment of a generation section of the system of FIG. 15A according to aspects of the present disclosure.

FIG. 16 illustrates a partial top plan view of an exemplary embodiment of a generation section 130 of the system of FIG. 15A according to aspects of the present disclosure.

Figure 17:
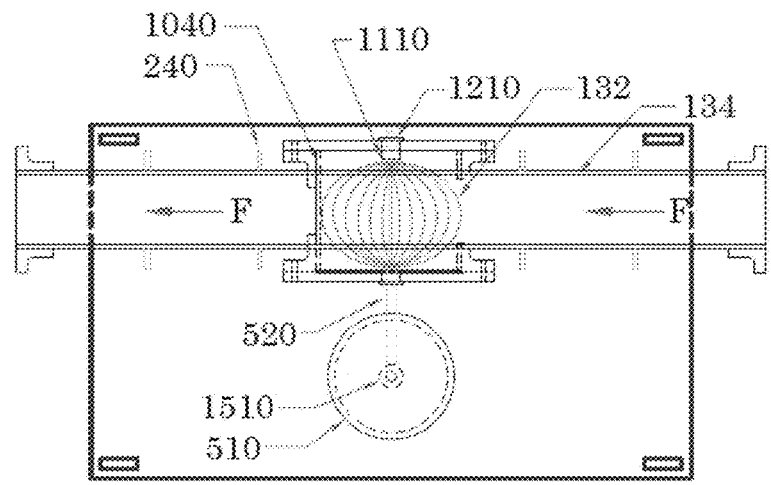
FIG. 17 illustrates a cross sectional view taken along line 17-17 of FIG. 15A, illustrating an exemplary embodiment of a partial top plan view according to aspects of the present disclosure.

FIG. 17 illustrates a cross sectional view taken along line 17-17 of FIG. 15A, illustrating an exemplary embodiment of a partial top plan view according to aspects of the present disclosure.

Figure 18:
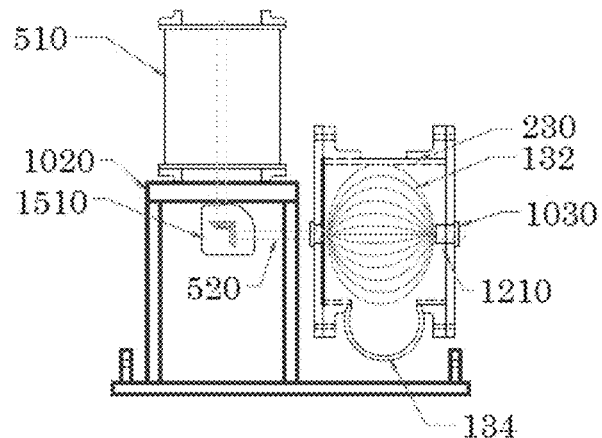
FIG. 18 illustrates a cross sectional view taken along line 18-18 of FIG. 16, illustrating an exemplary embodiment of a partial side view according to aspects of the present disclosure.

FIG. 18 illustrates a cross sectional view taken along line 18-18 of FIG. 16, illustrating an exemplary embodiment of a partial side view according to aspects of the present disclosure.

Figure 19:
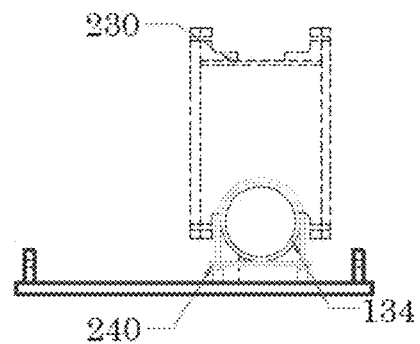
FIG. 19 illustrates a cross sectional view taken along line 19-19 of FIG. 16, illustrating an exemplary embodiment of a partial side view according to aspects of the present disclosure.

FIG. 19 illustrates a cross sectional view taken along line 19-19 of FIG. 16, illustrating an exemplary embodiment of a partial side view according to aspects of the present disclosure.

Figures 20A, 20B:
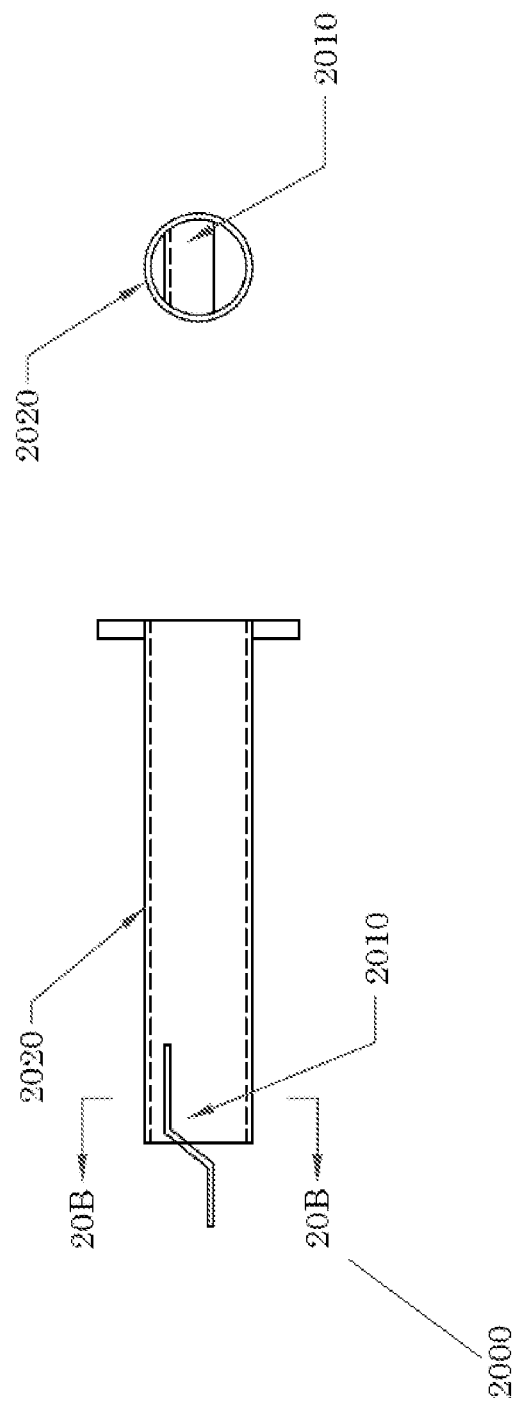
FIG. 20A illustrates a partial top plan view of an exemplary embodiment of a flange adapter assembly including a flow redirector according to aspects of the present disclosure.
FIG. 20B illustrates a cross sectional view taken along line 20B-20B of FIG. 20A, illustrating an exemplary embodiment of a partial side view of an exemplary embodiment of a flange adapter assembly including a flow redirector according to aspects of the present disclosure.

FIG. 20A illustrates a partial top plan view of an exemplary embodiment of a flange adapter assembly including a flow redirector according to aspects of the present disclosure. FIG. 20B illustrates a cross sectional view taken along line 20B-20B of FIG. 20A, illustrating an exemplary embodiment of a partial side view of an exemplary embodiment of a flange adapter assembly including a flow redirector according to aspects of the present disclosure.

FIGS. 20A-20B illustrate an exemplary embodiment of a flange adapter assembly 2000 including a flow redirector 2010 according to aspects of the present disclosure. The flow redirector 2010 may be temporarily or permanently mountable to the tube 2020. The tube 2020 may be configured to fit within at least a portion of a pipe section 134 of a generation section 130, for example by having a smaller outer diameter than an inner diameter of at least a portion of the pipe section 134. Although illustrated as fully filling an interior space of the pipe section 134 it should be appreciated that at least a portion of the tube 2020 may be of a size, shape, or configuration which does not fill an entire cavity of the pipe section 134. For example, at least one tube 2020 may be configured to redirect a predetermined amount, ratio, or percentage of flow through the pipe section 134 into a bypass section (e.g., either towards or away from at least a portion of the turbine 132 or a free-flowing section of the pipe section 134) using the flow redirector 2010. Similarly, a size, shape, angle, or characteristic of the flow redirector 2010 may be selected or determined according to at least one flow parameter. Adjustment to a size, angle, or position of the flow redirector 2010 may be performed by replacing the flange adapter assembly 2000 as a whole or by manually or providing a control scheme configured to adjust the flow redirector 2010 (e.g., in real-time using electronic communications received at the flange adapter assembly 2000 and/or system. Additionally or alternatively, at least one flow redirector 2010 may be configured to be used with a pipe 110, for example, within the pipe 110 directly or as coupleable to a tube 2020.

Figure 21:
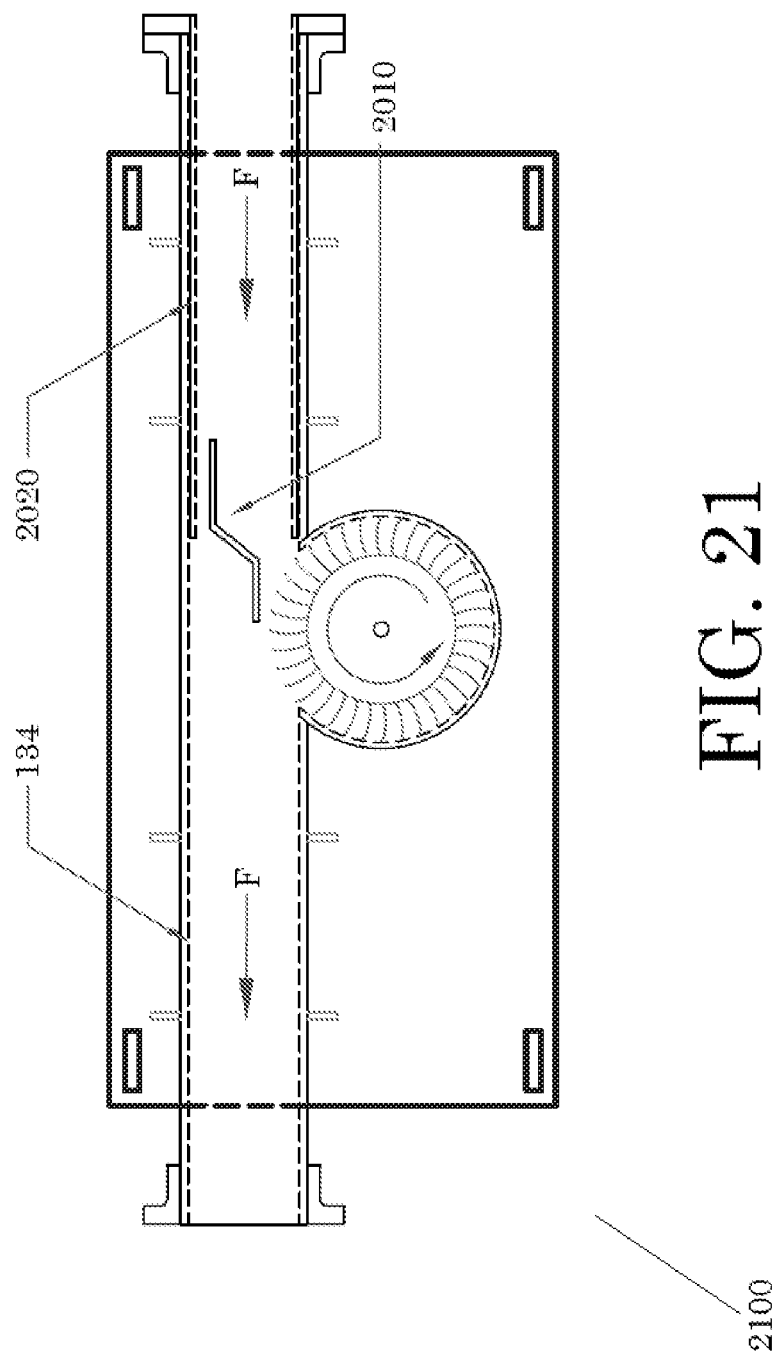
FIG. 21 illustrates a partial top plan view of an exemplary embodiment of a flange adapter assembly coupled to a generation section according to aspects of the present disclosure.

FIG. 21 illustrates a partial top plan view of an exemplary embodiment of a flange adapter assembly 2100 coupled to a generation section 130 according to aspects of the present disclosure.

Figure 22:
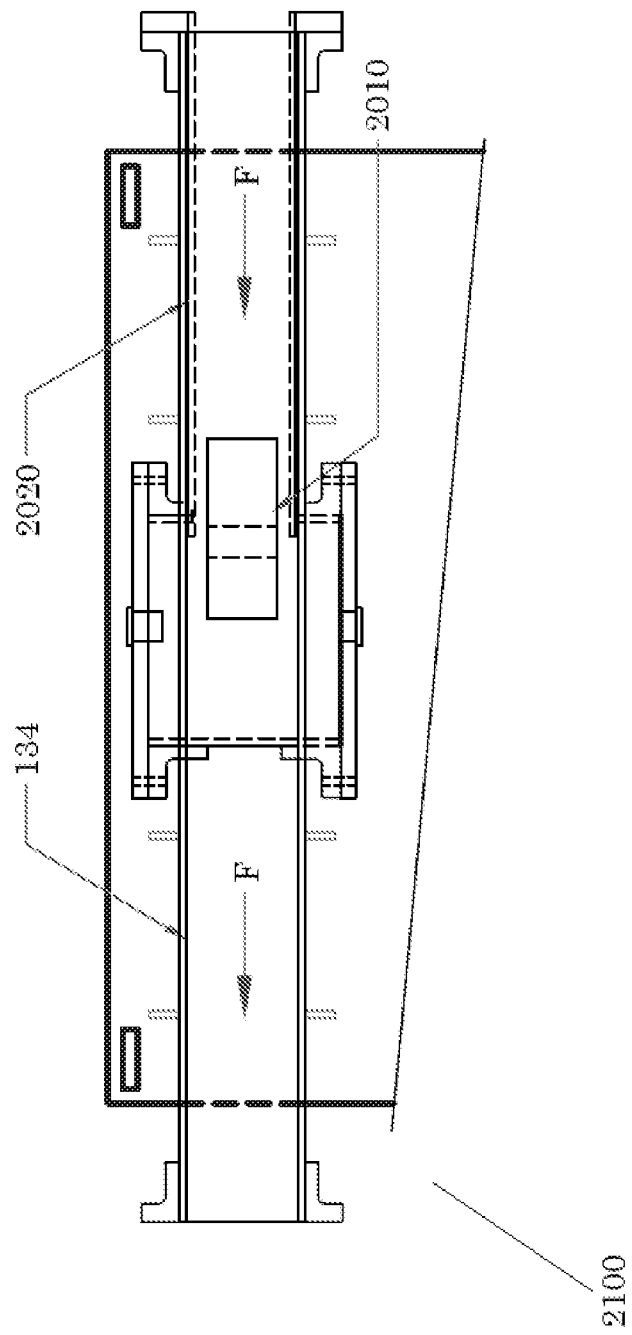
FIG. 22 illustrates a partial top plan view of an exemplary embodiment of a flange adapter assembly coupled to a generation section according to aspects of the present disclosure.

FIG. 22 illustrates a partial top plan view of an exemplary embodiment of a flange adapter assembly 2100 coupled to a generation section 130 according to aspects of the present disclosure.

Implementations consistent with the present disclosure are capable of obtaining significant advantages over previous systems by providing power generation. Testing data confirms that apparatuses, systems, and methods in accordance with the present disclosure are capable of providing significant results, even at low flow and pressure values.

Table 1 reflects exemplary testing data for four test runs, labeled as test runs 1-4. The test runs provide testing data corresponding to increasing flow of compressed air values within the pipe 110 and through the generation section 130 via the input flow 112. The test runs reflect information for a setup including an air compressor coupled to a pipe 110, optionally containing a valve 710 to block flow within the pipe 110. A generator of the generation section 130 (e.g., generator 510) may be a Permanent Magnet Generator (PMG) used to generate an output voltage and current based at least in part upon an operation of the turbine 132 responsive to input 152. The generator used in the exemplary tests was a 2,000 Watt PMG, although any size, capacity, or parameter of the generator may be modified or determined based on criteria of a flow type or rate, a pipe size, a desired output voltage or current, an expected flow amount, or any other parameter. The compressed air flow values provided in Table 1 are measured by a compressed air flow meter, such as a CDI 5400 flowmeter, in Standard Cubic Feet per Minute (SCFM) value under a heading of the same. A Rotation Per Minute (RPM) value of a turbine 132 and/or generator of generation section 130 (e.g., a generator 510).

TABLE 1

| Test Run | Voltage | RPM | SCFM |
|---|---|---|---|
| 1 | 12.3 | 247 | 203 |
| 2 | 14.1 | 285 | 214 |
| 3 | 83.5 | 1590 | 330 |
| 4 | 125 | 2400 | 400 |

As shown by Test Run 1 of Table 1, with a compressed air flow rate of 203 SCFM, the generator 510 was able to generate 12.3V from a turbine RPM of 247. When the compress air flow rate was increased to 214 SCFM in Test Run 2, the generator output voltage was increased to 14.1V at a turbine RPM of 285. In Test Run 3 the compressed air flow rate was increased to 330 SCFM, resulting in a generator output voltage of 83.5V with a turbine RPM of 1590. Finally, in Test Run 4 the compressed air flow rate was increased to 400 SCFM, resulting in a generator output voltage of 125V at a turbine RPM of 2400.

Table 2 reflects exemplary testing data for a test run for a water flow test, labeled as test run 1. The test run provides exemplary testing data corresponding to a water flow rate of 143 Gallons Per Minute (GPM) in the pipe 110 and through the generation section 130 via the input flow 112. The test runs reflect information for a setup including an air compressor coupled to a pipe 110, optionally containing a valve 710 to block flow within the pipe 110. As shown by Table 2, at a flow rate of 143 GPM in the as input flow 112, a voltage of 10.3V was generated by the generator of the generation section 130 with a turbine RPM of 210 at a pressure of 40 Pounds per Square Inch (PSI).

TABLE 2

| Test Run | PSI | Voltage | RPM | GPM |
|---|---|---|---|---|
| 1 | 40 | 10.3 | 210 | 143 |

The exemplary testing data of Tables 1 and 2 reflect real-world examples of how implementations consistent with the present disclosure are capable of generating power from a gas, liquid, or solid flow at an input flow 112 of a pipe 110 by diverting at least a portion of the input flow 112 through the generation section 130 at a bypass section of the pipe 110.

An apparatus may provide power generation when coupled to a pipe having an input flow. The apparatus includes an input section coupleable to the pipe, the input section configured to receive at least a portion of the input flow. The apparatus further includes a generation section coupleable to the input section, the generation section including a pipe section configured to carry the at least a portion of the input flow, a turbine coupleable to the pipe section and configured to capture energy from the at least a portion of input flow carried by the pipe section, and a generator coupleable to the turbine and configured to generate power from the energy captured by the turbine. The apparatus also includes an output section coupleable to the pipe and configured to provide output of the generation section to the pipe.

The apparatus may also include at least one valve, the at least one valve configured to control an amount of the at least a portion of the input flow carried through the generation section. The at least one valve may enable the at least a portion of the input flow to be less than an entire amount of the input flow.

The turbine of the generation section may capture energy from at least one of a liquid or a gas as the at least a portion of input flow carried by the pipe section.

The apparatus may include a transfer mechanism coupleable between the turbine and the generator to transfer at least a portion of the captured energy to the generator. A gear box may be coupleable to the transfer mechanism between the turbine and the generator. The gear box may translate motion received at the gear box from the transfer mechanism via the turbine to the generator.

The generation section may further includes a flange adapter assembly having a tube configured to fit within at least a portion of the pipe section, and a flow redirector coupleable to the tube, the flow redirector configured to redirect at least a portion of the input flow within the pipe section.

A system may provide power generation according to aspects of the present disclosure. The system includes a pipe having an input flow, an input section coupleable to the pipe, the input section configured to receive at least a portion of the input flow, a generation section coupleable to the input section, the generation section including a pipe section configured to carry the at least a portion of the input flow, a turbine coupleable to the pipe section and configured to capture energy from the at least a portion of input flow carried by the pipe section, and a generator coupleable to the turbine and configured to generate power from the energy captured by the turbine, and an output section coupleable to the pipe and configured to provide output of the generation section to the pipe.

The pipe may include a valve configured to restrict flow through at least a portion of the pipe.

At least one valve may be coupled between one of the input section and the pipe or the output section and the pipe, the at least one valve configured to control an amount of the at least a portion of the input flow carried through the generation section. The at least one valve may enable the at least a portion of the input flow to be less than an entire amount of the input flow.

The system may include a plurality of generation sections coupleable to the pipe at one or more locations via one or more corresponding input sections.

The turbine of the generation section may capture energy from at least one of a liquid or a gas as the at least a portion of input flow carried by the pipe section.

The system may include a transfer mechanism coupleable between the turbine and the generator to transfer at least a portion of the captured energy to the generator. A gear box may be coupleable to the transfer mechanism between the turbine and the generator. The gear box may translate motion received at the gear box from the transfer mechanism via the turbine to the generator.

The generation section may further include a flange adapter assembly having a tube configured to fit within at least a portion of the pipe section, and a flow redirector coupleable to the tube, the flow redirector configured to redirect at least a portion of the input flow within the pipe section.

A method may provide power generation according to aspects of the present disclosure. The method includes operations for receiving an input flow at a pipe, redirecting at least a portion of the input flow from the pipe to an input section, providing the redirected at least a portion of the input flow to a pipe section of a generation section, capturing energy from the at least a portion of input flow carried by the pipe section, generating power at the generation section by a generator based upon the captured energy, and outputting the at least a portion of the input flow to the pipe.

The method may further include controlling an amount of the redirected at least a portion of the input flow based at least in part using a valve coupled to the pipe.

The input flow may be at least one of a liquid or a gas.

The method may further include redirecting at least a portion of the at least a portion of the input flow in the pipe section using a redirector within the pipe section.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. An apparatus for providing power generation when coupled to a pipe having an input flow, comprising:
   an input section coupleable to the pipe, the input section configured to receive at least a portion of the input flow;
   a generation section coupleable to the input section, the generation section including a pipe section configured to carry the at least a portion of the input flow, a turbine coupleable to the pipe section and configured to capture energy from the at least a portion of input flow carried by the pipe section, and a generator coupleable to the turbine and configured to generate power from the energy captured by the turbine, the generation section further including a flange adapter assembly having (i) a tube configured to fit within at least a portion of the pipe section, and (ii) a flow redirector fixed within the tube, the flow redirector configured to redirect at least a portion of the input flow within the pipe section; and
   an output section coupleable to the pipe and configured to provide output of the generation section to the pipe.

2. The apparatus of claim 1, further comprising at least one valve, the at least one valve configured to control an amount of the at least a portion of the input flow carried through the generation section.

3. The apparatus of claim 2, wherein the at least one valve is configured to enable the at least a portion of the input flow to be less than an entire amount of the input flow.

4. The apparatus of claim 1, wherein the turbine of the generation section is configured to capture energy from at least one of a liquid or a gas as the at least a portion of input flow carried by the pipe section.

5. The apparatus of claim 1, further comprising a transfer mechanism, the transfer mechanism coupleable between the turbine and the generator to transfer at least a portion of the captured energy to the generator.

6. The apparatus of claim 5, further comprising a gear box coupleable to the transfer mechanism between the turbine and the generator, the gear box configured to translate motion received at the gear box from the transfer mechanism via the turbine to the generator.

7. A system for providing power generation, comprising:
   a pipe having an input flow;
   an input section coupleable to the pipe, the input section configured to receive at least a portion of the input flow;
   a generation section coupleable to the input section, the generation section including a pipe section configured to carry the at least a portion of the input flow, a turbine coupleable to the pipe section and configured to capture energy from the at least a portion of input flow carried by the pipe section, and a generator coupleable to the turbine and configured to generate power from the energy captured by the turbine, the generation section further including a flange adapter assembly having (i) a tube configured to fit within at least a portion of the pipe section, and (ii) a flow redirector fixed within the tube, the flow redirector configured to redirect at least a portion of the input flow within the pipe section; and
   an output section coupleable to the pipe and configured to provide output of the generation section to the pipe.

8. The system of claim 7, wherein the pipe includes a valve configured to restrict flow through at least a portion of the pipe.

9. The system of claim 7, further comprising at least one valve coupled between one of the input section and the pipe or the output section and the pipe, the at least one valve configured to control an amount of the at least a portion of the input flow carried through the generation section.

10. The system of claim 9, wherein the at least one valve is configured to enable the at least a portion of the input flow to be less than an entire amount of the input flow.

11. The system of claim 7, wherein the system comprises a plurality of generation sections coupleable to the pipe at one or more locations via one or more corresponding input sections.

12. The system of claim 7, wherein the turbine of the generation section is configured to capture energy from at least one of a liquid or a gas as the at least a portion of input flow carried by the pipe section.

13. The system of claim 7, further comprising a transfer mechanism, the transfer mechanism coupleable between the turbine and the generator to transfer at least a portion of the captured energy to the generator.

14. The system of claim 13, further comprising a gear box coupleable to the transfer mechanism between the turbine and the generator, the gear box configured to translate motion received at the gear box from the transfer mechanism via the turbine to the generator.

15. A method for providing power generation, comprising:
- receiving an input flow at a pipe;
- redirecting at least a portion of the input flow from the pipe to an input section, the redirecting including redirecting at least a portion of the at least a portion of the input flow in the pipe section using a redirector fixed within a tube within the pipe section;
- providing the redirected at least a portion of the input flow to a pipe section of a generation section;
- capturing energy from the at least a portion of input flow carried by the pipe section;
- generating power at the generation section by a generator based upon the captured energy; and
- outputting the at least a portion of the input flow to the pipe.

16. The method of claim 15, comprising:
controlling an amount of the redirected at least a portion of the input flow based at least in part using a valve coupled to the pipe.

17. The method of claim 15, wherein the input flow is at least one of a liquid or a gas.

* * * * *